(12) United States Patent
Ito

(10) Patent No.: US 7,869,698 B2
(45) Date of Patent: Jan. 11, 2011

(54) INFORMATION RECORDING/PLAYBACK METHOD AND RECORDING/PLAYBACK APPARATUS

(75) Inventor: Seigo Ito, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1091 days.

(21) Appl. No.: 11/600,199

(22) Filed: Nov. 16, 2006

(65) Prior Publication Data

US 2007/0116431 A1    May 24, 2007

(30) Foreign Application Priority Data

Nov. 18, 2005   (JP)  ............... 2005-334378

(51) Int. Cl.
*H04N 9/80* (2006.01)
(52) U.S. Cl. ..................................... 386/248
(58) Field of Classification Search .................. 386/46, 386/83, 95, 124–126
See application file for complete search history.

(56) References Cited

U.S. PATENT DOCUMENTS

2004/0184764 A1* 9/2004 Yagi et al. ..................... 386/46

FOREIGN PATENT DOCUMENTS

| JP | 11-184737    | 7/1999  |
| JP | 2000-13728   | 1/2000  |
| JP | 2001-337851  | 12/2001 |
| JP | 2004-171670  | 6/2004  |
| JP | 2005-044422  | 2/2005  |
| JP | 2005-135126  | 5/2005  |

OTHER PUBLICATIONS

Notice of Reasons for Rejection mailed Dec. 22, 2009, from the Japanese Patent Office for Japanese Patent Application No. 2005-334378 (2 pages).
Notice of Reasons for Rejection mailed Dec. 22, 2009, from the Japanese Patent Office for Japanese Patent Application No. 2005-334378 (2 pages).

* cited by examiner

*Primary Examiner*—Thai Tran
*Assistant Examiner*—Mishawn Dunn
(74) *Attorney, Agent, or Firm*—Finnegan, Henderson, Farabow, Garrett & Dunner, L.L.P.

(57) ABSTRACT

An apparatus is provided in which a recording area is effectively utilized even when information-deleted portions and/or information-moved portions are provided on an information recording medium. The apparatus includes a space extent management section which recognizes and manages space extents, an optimization processing section which creates a coupled extent by coupling a information-deleted portion and a space extent in a condition that the above extents are adjacent to each other and optimizes the coupled extent as one space extent to be used for recording, and an extent arrangement processing section which arranges and manages the space extents according to a preset rule.

10 Claims, 14 Drawing Sheets

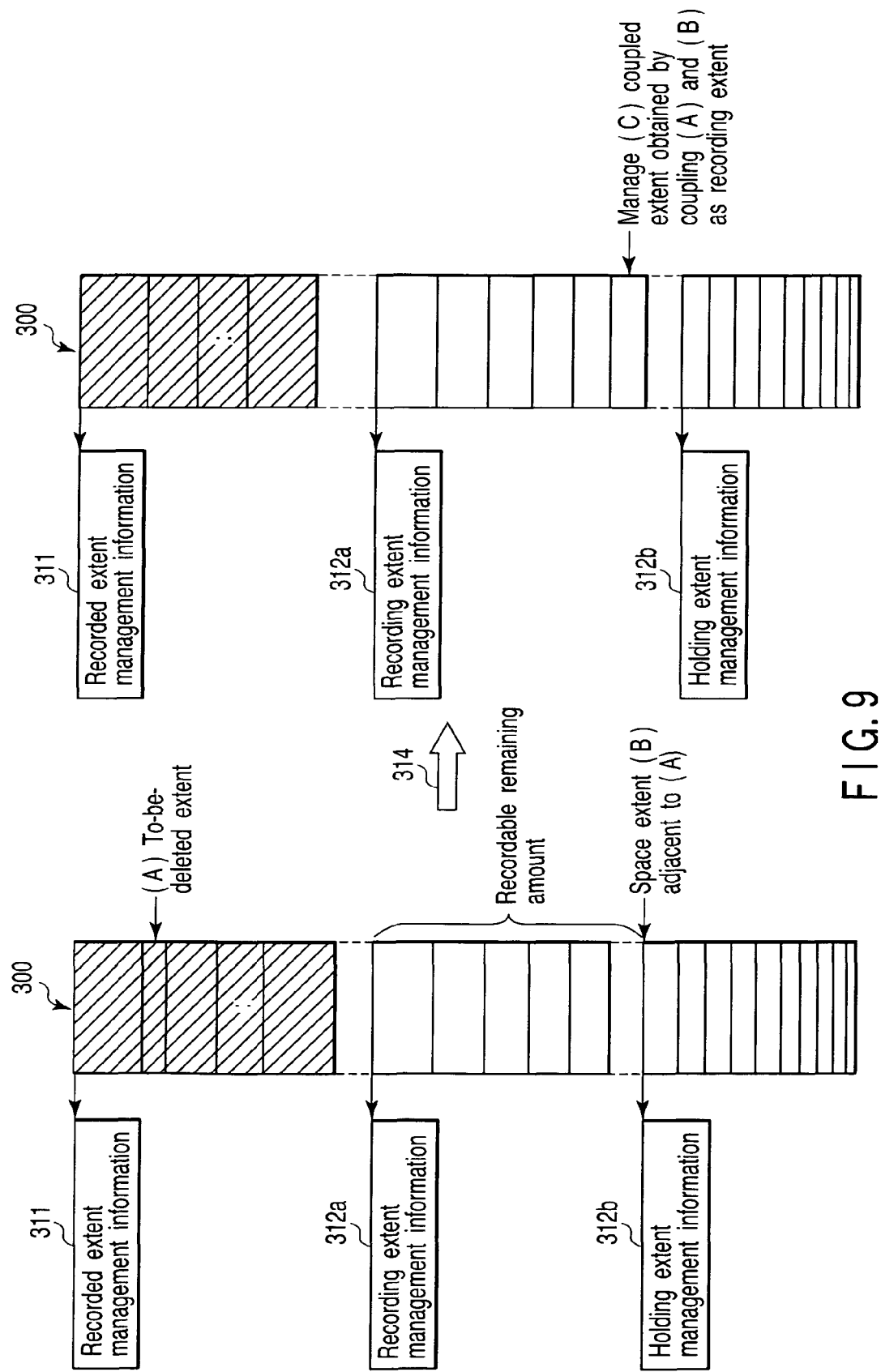
F I G. 9

INFORMATION RECORDING/PLAYBACK METHOD AND RECORDING/PLAYBACK APPARATUS

CROSS-REFERENCE TO RELATED APPLICATIONS

This application is based upon and claims the benefit of priority from prior Japanese Patent Application No. 2005-334378, filed Nov. 18, 2005, the entire contents of which are incorporated herein by reference.

BACKGROUND

1. Field

This invention relates to an information recording/playback method and recording/playback apparatus and more particularly to the improvement of a file management method.

2. Description of the Related Art

In, for example, an information recording/playback apparatus having a digital versatile disk (DVD) as a recording medium, a recording reservation area is ensured and data is recorded in the ensured recording reservation area when data is recorded in a data area of the information recording medium. At this time, in the file system, an extent which expresses the access unit is defined by use of information of the data size and an address of the recording reservation area and a file entry which manages the extent is defined.

As a patent document associated with the file system, Patent Document 1 (Jpn. Pat. Appln. KOKAI Publication No. 2005-135126) is provided. In Patent Document 1, the technique for comparing the file size with a plurality of threshold values previously set and making reservation for data writing in a recording area with a reservation size corresponding to the file size at the time of the file writing process is provided.

The extent is used to realize a smooth and continuous playback process of audio/video data recorded on the information recording medium. As a technique similar to the utilization method of the extent, the technique disclosed in Patent Document 2 (Jpn. Pat. Appln. KOKAI Publication No. 2000-13728) is provided. In this case, sector information of a video disk is referred to by use of a control section. The control section performs a control operation to retrieve a continuous space area of a preset size or more which ensures continuous playback and which does not extend over the zone boundary and write a video object in the retrieved continuous space area.

As a technique similar to the technique of management of the continuous space area, the technique disclosed in Patent Document 3 (Jpn. Pat. Appln. KOKAI Publication No. H11-184737) is provided. In the Patent Document, the technique for attaching cluster ID to a cluster having a constant size and managing a space cluster by use of the cluster ID is disclosed.

A hard disk, DVD-RAM and DVD-RW are rewritable media and various editing processes are performed for recorded contents. For example, a deleting process is performed in a plurality of locations in some cases. Further, a moving process and copying process are performed in some cases.

When part of the contents is subjected to the deleting process or moving process, an information-deleted portion or information-moved portion of the information recording medium is managed as a space extent by the file system. At this time, when the space extent occurs, the extent is managed again as a recording extent. However, various space extents ranging from the large size to the small size are provided and various addresses thereof are also provided. Therefore, there occurs a problem that the management of the recording extent becomes complicated. Further, a method for managing only the space extent of a preset size or more as the recording extent is considered, but in this case, the number of space extents of smaller sizes becomes large and the recording area will become useless.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 9 is an explanatory diagram for illustrating an operation example when the apparatus of this invention manages the extent.

DETAILED DESCRIPTION

Various embodiments according to the invention will be described hereinafter with reference to the accompanying drawings.

An object of one embodiment of this invention is to provide an information recording/playback method and recording/playback apparatus which can easily manage extents and effectively utilize the recording area of an information recording medium by causing space extents to be effectively utilized even when information-deleted portions and/or information-moved portions are formed on the recording medium.

According to one embodiment of this invention, there is provided an apparatus comprising a data processing section which records data on an information recording medium and reads out data recorded on the information recording medium, an encoder section which converts input data to recording data and supplies the thus converted data to the data processing section, a decoder section which decodes data output from the data processing section, and a system control section which controls the data processing section, encoder section and decoder section, wherein the system control section recognizes and manages those of space extents which have a size not smaller than a preset size as recording extents, recognizes and manages those of the space extents which have a size smaller than the preset size as holding extents, forms a coupled extent by coupling one of the holding extents with another holding extent adjacent thereto and sets the coupled extent as a new recording extent when the size of the coupled extent is not smaller than the preset size, and causes the recording extent managing section to manage the new recording extent.

According to the above means, even if a large number of information-deleted portions and/or information-moved portions are formed on the information recording medium, an increase in the number of extents can be suppressed since new recording extents are formed, it becomes easy to manage the extents and the recording area of the recording medium can be effectively utilized.

Figure 1:
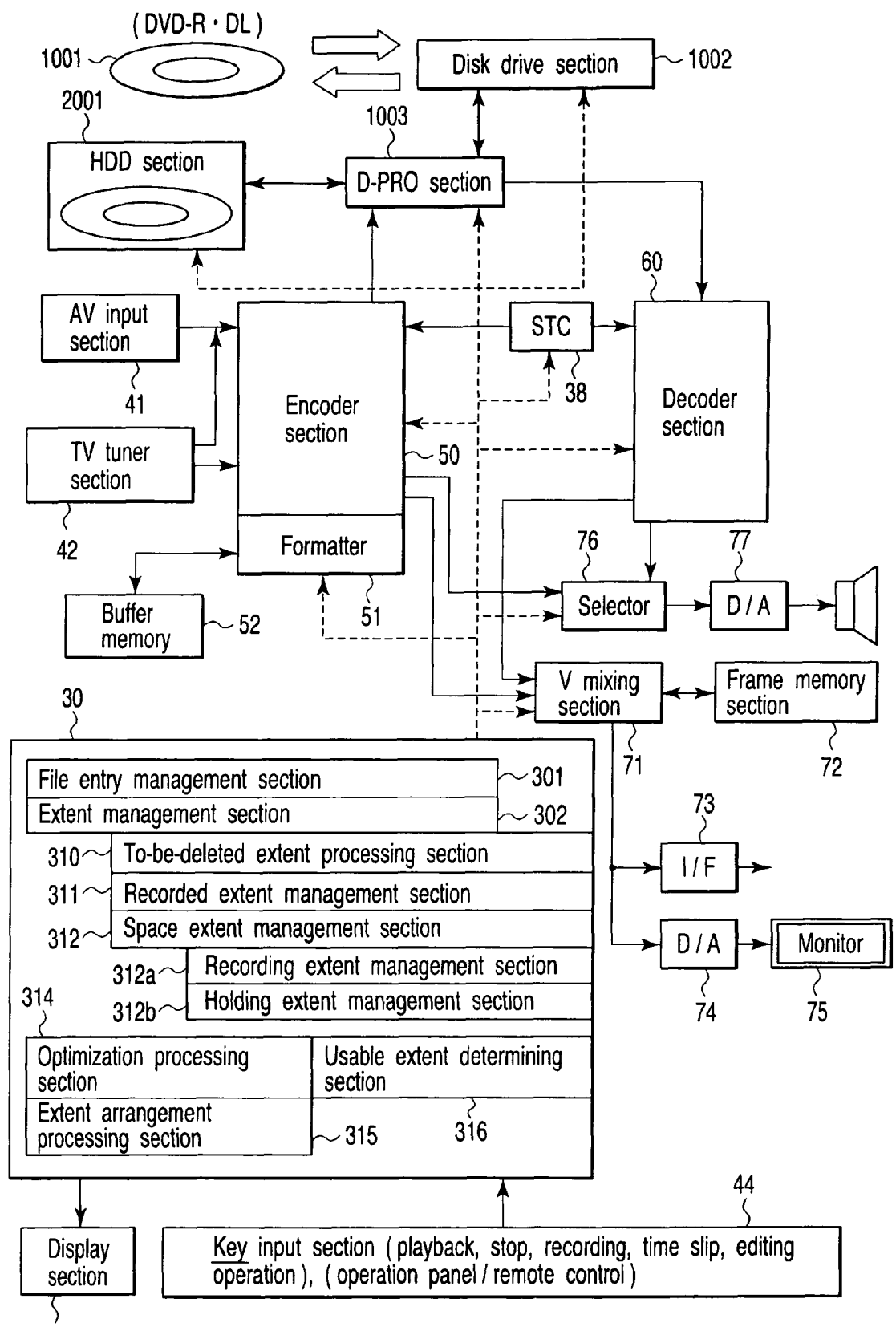
FIG. 1 is an exemplary block diagram showing the configuration of an information recording/playback apparatus to which this invention is applied.

There will now be described an embodiment of this invention in detail with reference to the accompanying drawings. In FIG. 1, the whole block configuration of a recording/playback apparatus (video recording apparatus) to which this invention is applied is shown. In the present embodiment, a device (DVD-VR recorder with HDD) which can deal with both of a hard disk and an optical disk such as a DVD-R is shown as a recording medium. However, a semiconductor memory or the like can be adequately used as the recording medium together with the above device. In FIG. 1, the apparatus is roughly divided into two blocks, that is, the main block of the recording section on the left side and the main block of the playback section on the right side.

The video recording apparatus of FIG. 1 has two types of disk drive sections. First, it includes a disk drive section 1002 which rotates and drives an optical disk (such as a DVD-RAM, DVD±RW, DVD±R) 1001 used as a first medium which is an information recording medium usable to construct video files and performs an information read/write process. Further, it includes a hard disk drive section 2001 which drives a hard disk drive (HDD) as a second medium. A data processor section 1003 can supply recording data to the disk drive section 1002 and hard disk drive section 2001 and receive a played-back signal. The disk drive section 1002 has a rotation control system, laser drive system (using a red laser with a wavelength of 650 nm or a blue laser with a wavelength of 405 nm or less), optical system and the like for the optical disk 1001. The data processor section 1003 deals with data of recording unit or playback unit and includes a buffer circuit, modulation/demodulation circuit, error correcting section and the like.

The video recording apparatus of FIG. 1 includes an encoder section which configures a recording side section, a decoder section 60 which configures a playback side section, and a microcomputer block (which can also be referred to as a system control section) 30 which controls the operation of the apparatus main body as main constituents. The encoder section 50 includes a video and audio analog-to-digital converter which converts an input analog video signal and analog audio signal into digital form, a video encoder, and an audio encoder. Further, it includes a sub-video encoder. An output of the encoder section 50 is converted into a preset DVD-RAM format by use of a formatter 51 containing a buffer memory and is then supplied to the data processor section 1003. An external analog video signal and external analog audio signal from an AV input section 41 or an analog video signal and analog audio signal from a TV tuner section 42 are input to the encoder section 50.

When a digital video signal and digital audio signal directly compressed are directly input to the encoder section 50, it can directly supply the compressed digital video signal and digital audio signal to the formatter 51. Further, the encoder section 50 can directly supply the digital video signal and digital audio signal subjected to the analog-to-digital conversion process to a video mixing section 71 and audio selector 76. In the video encoder contained in the encoder section 50, the digital video signal is converted into a digital video signal compressed with a variable bit rate based on the MPEG2 (or MPEG1 or MPEG4-AVC) standard. The digital audio signal is converted into a digital audio signal of linear PCM or a digital audio signal compressed with a fixed bit rate based on the MPEG or AC-3 standard.

When the sub-video signal is input from the AV input section 41 (such as a signal from a DVD video player with an independent output terminal for the sub-video signal, for example) or when a DVD video signal with the above data structure is broadcast and received by the TV tuner section 42, the sub-video signal in the DVD video signal is encoded (run-length coded) by the sub-video encoder and makes a bit map of the sub-video image. The encoded digital video signal, digital audio signal and sub-video data are packed by the formatter 51 to form a video pack, audio pack and sub-video pack. Further, the packs are collected together and converted into a format (DVD video format) specified by the DVD-video standard or a format (DVD-VR format) specified by the DVD-recording standard.

The apparatus shown in FIG. 1 supplies information (video, audio, sub-video data packs) formatted in the formatter 51 and management information formed to the hard disk drive section 2001 or data disk drive section 1002 via the data processor section 1003 to record the above information on the hard disk or optical disk 1001. Further, information recorded on the hard disk or optical disk 1001 can be recorded on the optical disk 1001 or hard disk via the data processor section 1003 and disk drive section 1002.

Further, video objects of a plurality of programs recorded on the hard disk or the optical disk 1001 can be subjected to an editing process, for example, a process for partially deleting the video objects or coupling objects of different programs. This is because the DD-VR format used in one embodiment of this invention defines the data unit dealt with and makes it possible to simplify the editing process.

The microcomputer block 30 contains a micro-processing unit (MPU) or central processing unit (CPU), a firmware ROM in which control programs and the like (firmware which perform the control operations illustrated in the respective flowcharts) are written, a work RAM used to provide a work area required for execution of the program and the like. The MPU of the microcomputer block 30 performs the faulty location detecting process, non-recording area detecting process, picture recording information recording position setting process, UDF recording process, AV address setting process, history information retrieving process and the like by using the RAM as a work area according to the control program stored in the ROM.

That is, the microcomputer block 30 has an information processing section required to generally control the whole system. The microcomputer block 30 includes a firmware ROM 31a, work RAM 31 and directory detecting section 32. Although not shown in the drawing, it additionally includes a whole video management (VMG) information forming section, copy-related information detecting section, copying and scrambling information processing section (RDI processing section), packet header processing section, sequence header processing section, aspect ratio information processing section and the like.

In the present apparatus, an extent which expresses the access unit is defined by use of an address and data size information with respect to the data recording area of the information recording medium and data is recorded and played back by use of a file entry which has a plurality of extents and manages a file. For this purpose, the microcomputer block 30 further includes a file entry management section 301 in which an extent management section 302 is contained. The extent management section 302 includes a to-be-deleted extent processing section 310, recorded extent management section 311 and space extent management section 312.

The space extent management section 312 includes a recording extent management section 312a which recognizes and manages those of the space extents which have a size not smaller than a preset size, for example, as recording extents. Further, it includes a holding extent management section 312b which recognizes and manages those of the space extents which have a size smaller than the preset size as holding extents.

The extent management section includes an optimization processing section 314 which sets a coupled extent as a new space extent or recording extent when the size of the coupled extent formed by coupling one holding extent with another holding (or to-be-deleted) extent adjacent thereto is equal to or larger than the preset size.

Further, the extent management section may further include an extent arrangement processing section 315 and usable extent determining section 316. The management of the extent will be described in detail later.

The contents to be notified to the user among the execution results of the MPU are displayed on a display section 43 of the video data recording/playback apparatus or displayed on a monitor display 75 in an on-screen display (OSD) fashion. Further, the microcomputer block 30 has a key input section 44 which supplies an operation signal used to operate the apparatus. For example, the key input section 44 corresponds to operation switches provided on the main body of the video recording apparatus or a remote control device. Further, the input section 44 may be a personal computer connected to the video recording apparatus according to one embodiment of this invention by use of means such as wired communication, radio communication, optical communication or infrared communication. In any case, the user can perform the recording process for input video audio signals, the playback process for recorded contents or the editing process for recorded contents by operating the key input section 44.

The timings at which the microcomputer block 30 controls the disk drive section 1002, hard disk drive section 2001, data processor section 1003, encoder section 50 and/or decoder section 60 may be determined based on time data from a system time clock (STC) 38. The recording and playback operations are generally performed in synchronism with the time clock from the STC 38, but the other processes may be performed at timings independent of the timings of the STC 38.

The decoder section 60 includes a separator which separates and takes out respective packs from a DVD format signal with the pack structure, a memory used at the execution time of pack separation and other signal processes, a V decoder which decodes main video data (the contents of the video pack) separated by the separator, an SP decoder which decodes sub-video data (the contents of the sub-video pack) separated by the separator, and an A decoder which decodes audio data (the contents of the audio pack) separated by the separator. Further, it includes a video processor which adequately synthesizes the decoded sub-video image on the decoded main video image, superimposes a menu, highlight button, subtitles and other sub-video images on the main video image and outputs the superimposed image.

The output video signal of the decoder section 60 is input to a video mixing section 71. In the video mixing section 71, text data items are synthesized. Further, the video mixing section 71 is connected to a line used to directly take in signals from the TV tuner 42 and A/V input section 41. The video mixing section 71 is connected to a frame memory 72 used as a buffer. An output of the video mixing section 71 is output to the exterior via an interface (I/F) 73 when it is an analog output. Further, it is output to the exterior via a digital-to-analog converter 74 when the output is a digital output.

An output audio signal of the decoder section 60 is converted into a analog form by a digital-to-analog converter 77 via a selector 76 and then output to the exterior. The selector 76 is controlled by a select signal from the microcomputer block 30. As a result, the selector 76 can directly select a signal which is passed through the encoder section 50 when the digital signal from the TV tuner 42 and A/V input section 41 is directly monitored.

In the formatter 51 of the encoder section 50, separation information items are formed and periodically supplied to the MPU of the microcomputer block 30 during the recording operation (information at the time of GOP head interruption). As the separation information, the number of packs of VOBU, an end address of an I picture from the VOBU head, VOBU playback time and the like are provided. At this time, information from the aspect information processing section is supplied to the MPU at the recording start time and the MPU forms VOBU stream information (STI). In this case, STI contains resolution data, aspect data and the like and the initialization state is set based on the above information in each decoder section at the playback time.

In the apparatus of FIG. 1, one disk is set for each file in the video file. Further, in order to continuously perform the playback operation without interruption while data is being accessed (subjected to the seek operation), an information unit (size) which continues for the least period of time is determined. The unit is called an extent (or CDA). The size of the extent is a multiple of the size of an error correction code (ECC) block (16 sectors), for example, and information is recorded in the unit of extent in the file system.

The data processor section 1003 receives data of VOBU unit from the formatter of the encoder section 50 and supplies data of extent unit to the disk drive section 1002 or hard disk drive section 2001. Further, the MPU of the microcomputer block 30 forms management information required for playing back recorded data and if it recognizes a command indicating termination of a data recording process, the MPU supplies the formed management information to the data processor section 1003. Thus, management information is recorded on the disk. Therefore, when the encoding process is performed, the MPU of the microcomputer block 30 receives information (such as separation information) of data unit from the encoder section 50. Further, the MPU of the microcomputer block 30 recognizes management information (file system) read out from the optical disk or hard disk at the recording start time, recognizes non-recording areas of the respective disks and sets a data recording area on the disk via the data processor section 1003.

Next, management information is explained. As management information on the disk, a file system is provided. In the file system, file entry is defined and the file entry is used to manage the extents.

Figure 2:
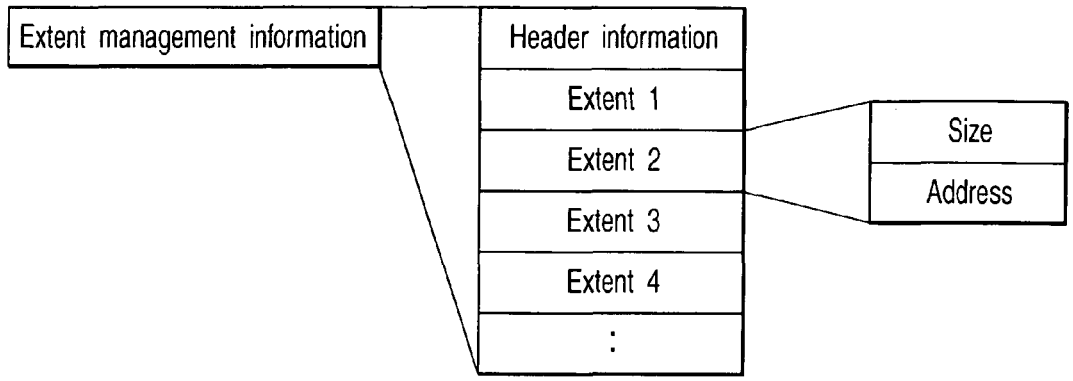
FIG. 2 is an exemplary diagram showing the configuration of extent management information.

FIG. 2 shows the basic configuration of extent management information. Extent management information 201 contains a header 211 and extents #1, #2, . . . . Each extent #n (n=1, 2, . . . ) contains the size and address as information. As the size, the upper limit and lower limit are set.

Figure 3:
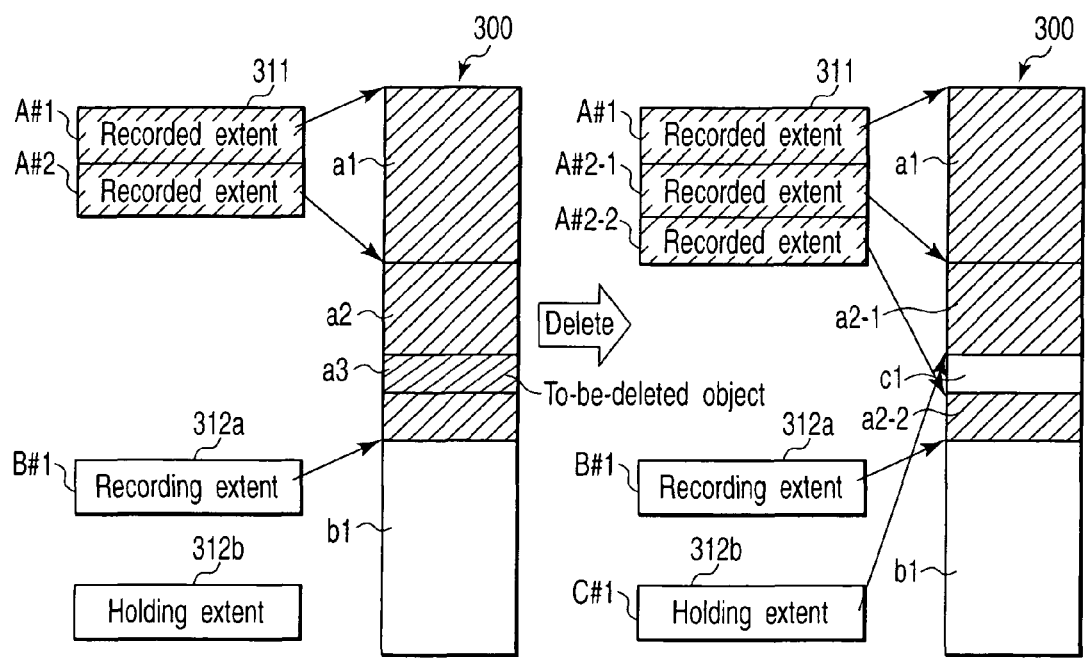
FIG. 3 is an explanatory diagram showing the extent array and management state, for illustrating the basic idea of this invention.
Figure 4:
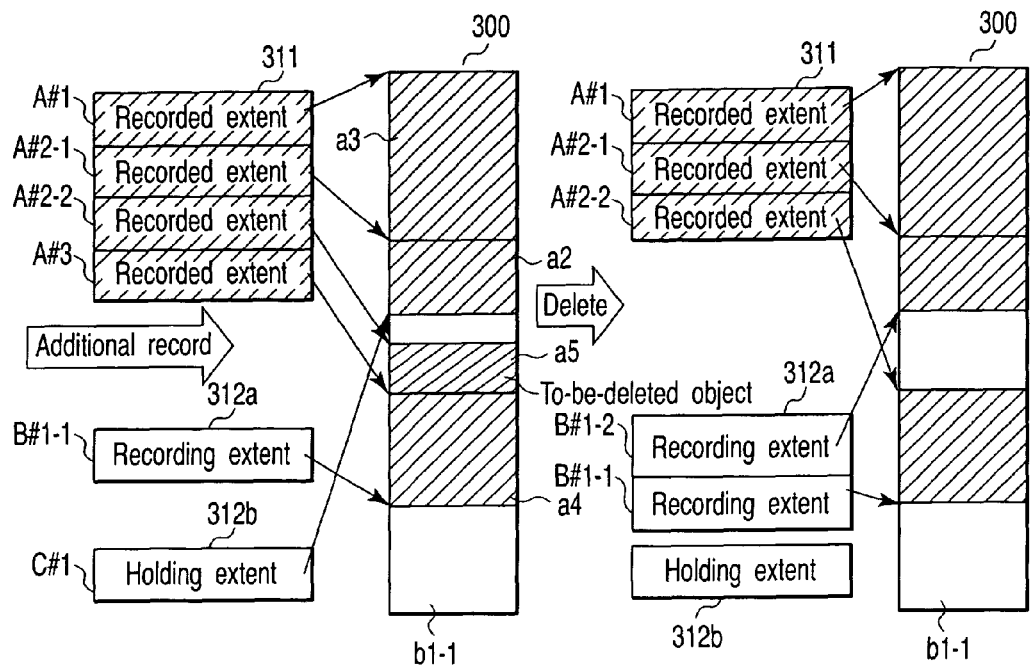
FIG. 4 is an explanatory diagram showing the extent array and management state, for illustrating the basic idea of this invention following on the illustration in FIG. 3.

FIGS. 3 and 4 each show the basic extent management method of this invention. It is now assumed that information is recorded in recorded areas a1, a2 of a data area 300 of the recording medium as indicated by oblique lines on the left side of FIG. 3 and part of the area a2 is a to-be-deleted area a3. The recorded areas a1, a2 are managed as recorded extents A#1, A#2 in the extent management information of the file system. An area b1 is a space extent b1 contained in the non-recording area and it is managed as a recording extent B#1 in the extent management information.

In this case, if the to-be-deleted area a3 is actually deleted, a portion of the area a3 becomes a space extent as shown on the right side of FIG. 3. In the apparatus of this invention, the area a3 is not instantly managed as a recording extent, but the size thereof is checked. If the size does not reach a preset threshold value, the area a3 is managed as a holding extent C#1. At this time, the former recorded extent A#2 is divided into two areas A#2-1, A#2-2.

Next, the holding extent utilizing method is explained with reference to FIG. 4. It is now assumed that new data is recorded in the recording extent shown on the right side of FIG. 3 as shown on the left side of FIG. 4 and a recorded area a4 is formed. The recorded area a4 is managed as a recorded extent A#3. The recording extent is used as a recording extent B#1-1 whose contents are updated.

Next, it is assumed that a to-be-deleted area a5 (corresponding to the former area a2-2) is formed in part of the recorded area a4. Then, if the to-be-deleted area a5 is actually deleted, part of the area a5 becomes a space extent as shown on the right side of FIG. 4. In this case, it is located adjacent to a management area cl of the holding extent C#l explained before with reference to FIG. 3.

In such a case, the apparatus of this invention checks the total sum of the sizes of the area a5 and area c3. Then, if the size of the coupled extent obtained by coupling the extents becomes equal to or larger than the preset threshold value, the coupled extent is set and managed as a new recording extent B#1-2. That is, when the size of the coupled extent obtained by coupling one holding extent with another holding (to-be-deleted or moved) extent becomes equal to or larger than the preset threshold value, the coupled extent is set as a new recording extent. This means that the recorded extent A#3 is deleted.

In this invention, a process for obtaining a new recording extent as described above is called an optimization process. Those of the space extents which have a size smaller than a preset threshold value are recognized and managed as holding extents. In the example of this explanation, a holding extent to be managed is not present. In the above example, only the to-be-deleted area is shown, but it is of course possible to use a different holding extent or an extent in an area which is no more required to be managed after deletion of data or after data has been moved as an extent to be coupled with the above holding extent.

In the above example, for clarifying the explanation, the management state in which the number of to-be-deleted areas and the number of holding extents are small is explained. However, as the number of to-be-deleted areas and the number of holding extents are increased, the effect of this invention becomes more significant. That is, even if a large number of information-deleted portions and information-moved portions are provided on the information recording medium, an increase in the number of extents is suppressed since a new recording extent is formed by the optimization process. As a result, it becomes possible to easily manage the extents and effectively utilize the recording area of the recording medium.

Figure 5:
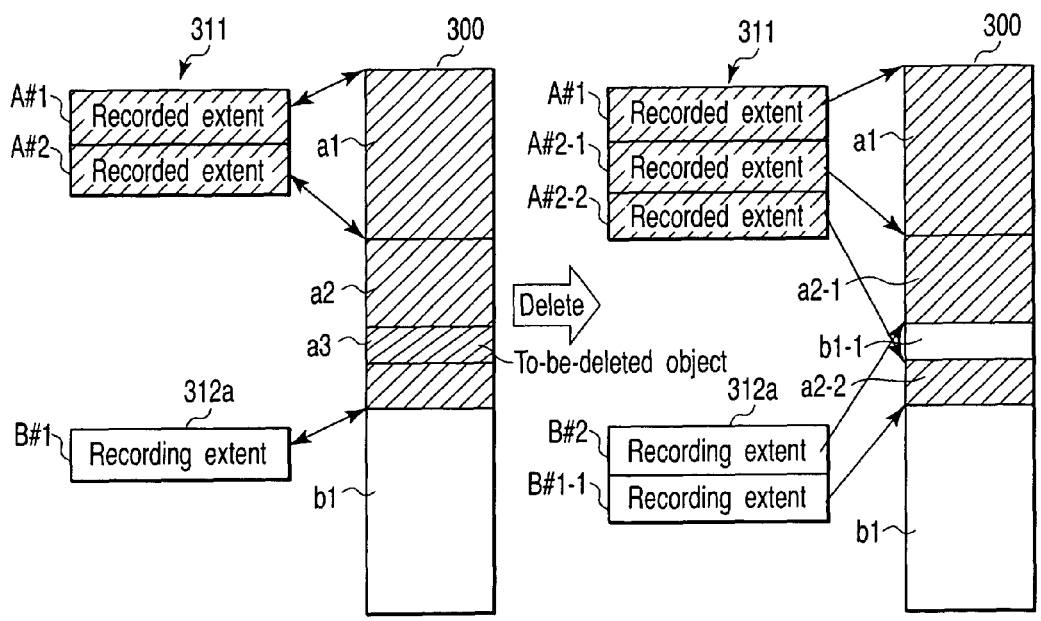
FIG. 5 is an explanatory diagram showing the extent array and management state, for illustrating the validity of this invention.
Figure 6:
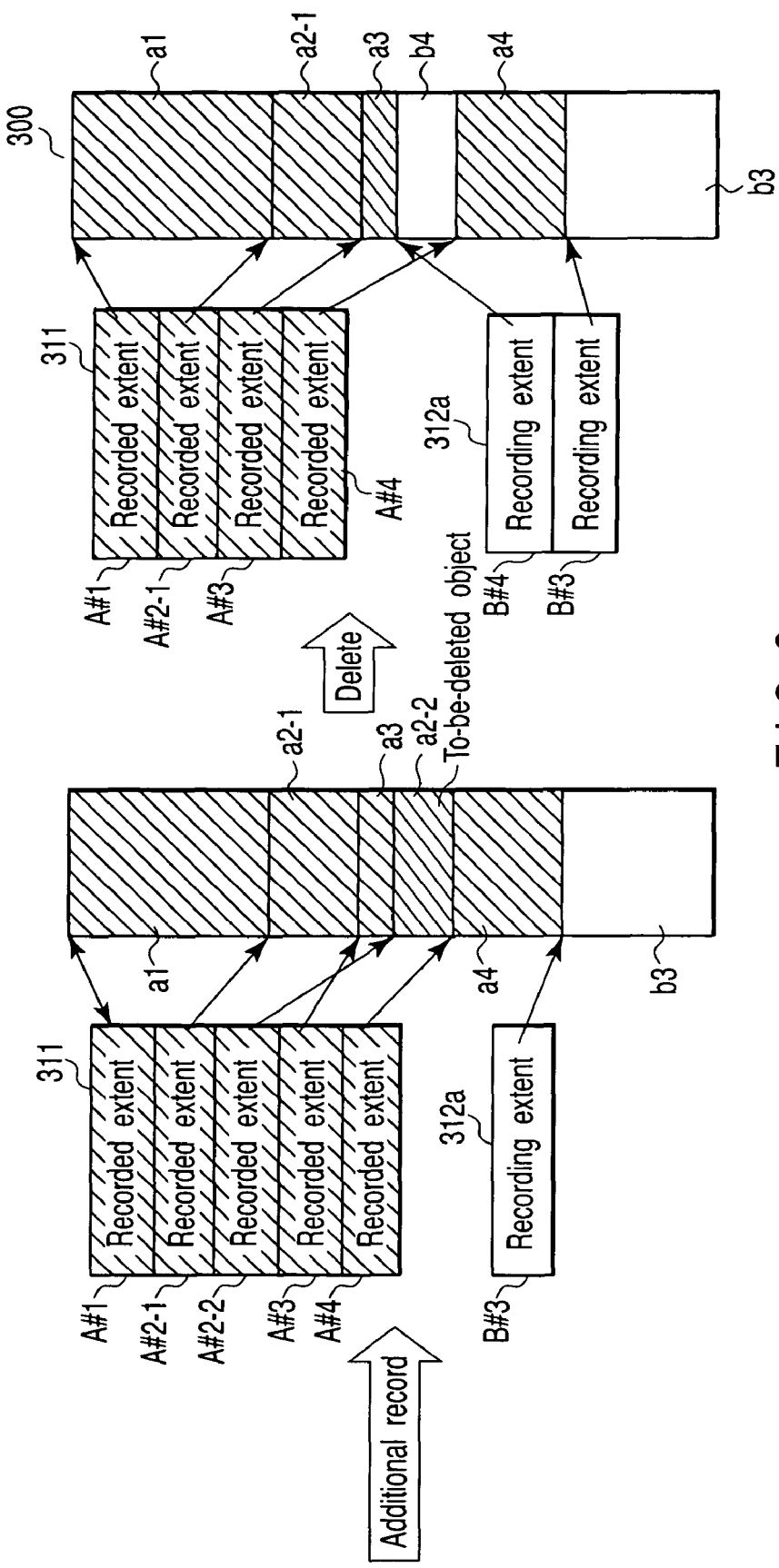
FIG. 6 is an explanatory diagram showing the extent array and management state, for illustrating the validity of this invention following on the illustration in FIG. 5.

FIGS. 5 and 6 each show a comparison example to illustrate the effect of this invention. The examples of FIGS. 5 and 6 show the states in which the recorded extents are managed and the management process is performed only by use of the recording extents without managing the holding extents. The example of FIG. 5 corresponds to the state of FIG. 3 and the example of FIG. 6 corresponds to the state of FIG. 4. As shown in FIG. 5, when data of the to-be-deleted area a3 is actually deleted, the area is managed as a new recording extent B#2. In this case, when data is recorded, data is recorded in the recording extents B#2, B#1-1. Then, as shown on the left side of FIG. 6, recording extents A#3, A#4 are additionally provided after the recorded extent A#2-2. The recording extent is managed as a new recording extent B#3 of the area b3.

In this case, it is assumed that a corresponding area of the recorded extent A#2-2 is a to-be-deleted area and a process of deleting data in this portion is performed. Then, as shown on the right side of FIG. 6, the recorded extents A#1, A#2-1, A#3, A#4 remain and recording extents B#4, B#3 are formed.

With the management method shown in FIGS. 5 and 6, a large number of extents having small sizes are formed, an amount of management information increases and a heavier load is imposed on the data process of the apparatus. However, with the management method explained in FIGS. 3 and 4, new recording extents of a size larger than the preset threshold value are formed by the optimization process and an increase in the number of small extents is suppressed. Thus, it becomes possible to easily manage the extents and effectively utilize the recording area of the recording medium.

Figure 7:
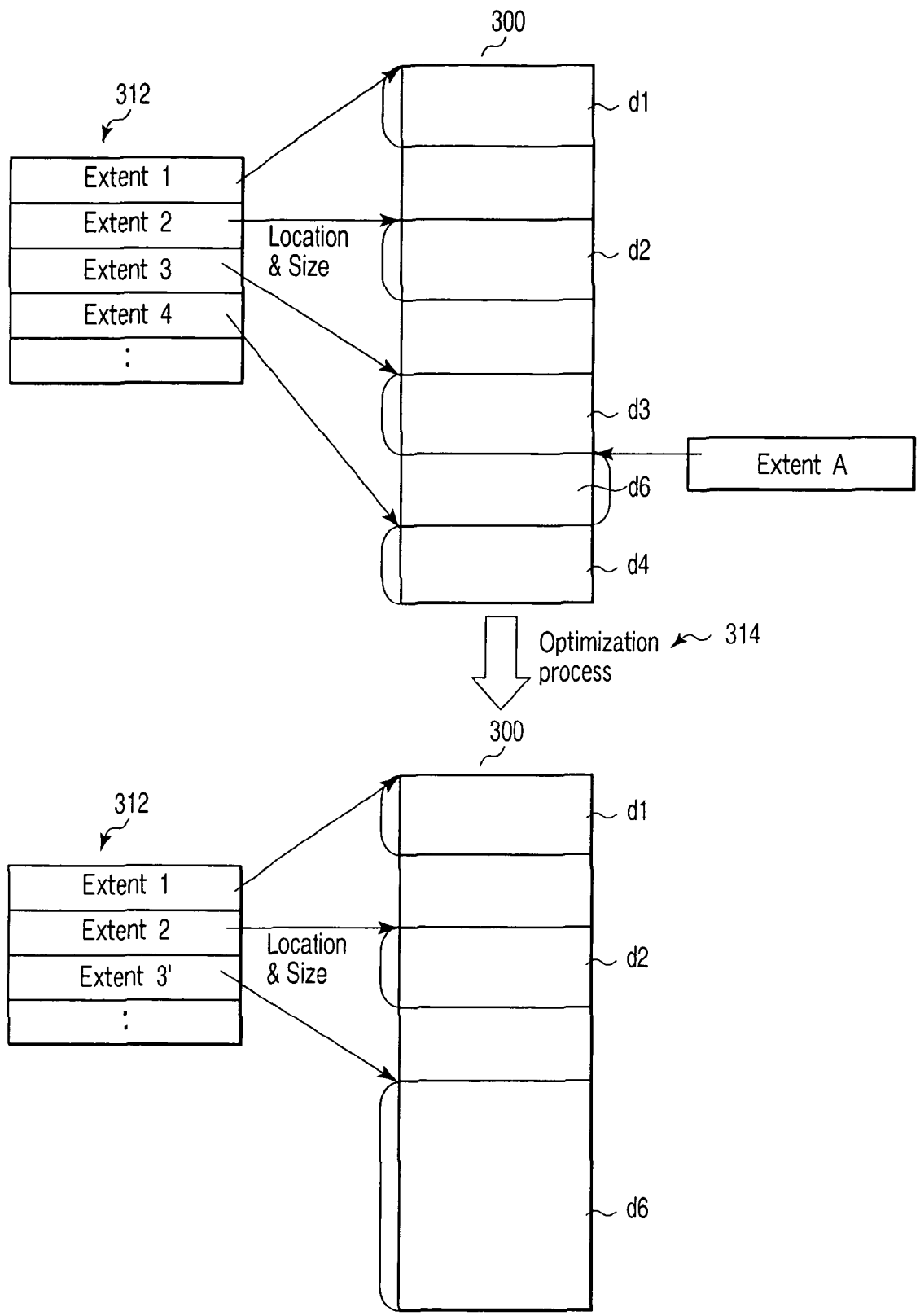
FIG. 7 is an explanatory diagram showing an operation example of the apparatus of this invention, for illustrating an example of formation of a coupled extent.

FIG. 7 shows the management state of the recording extents when the optimization process is performed. It is supposed that extents 1, 2, 3, 4 are managed by a recording extent management section 312a as shown in the upper stage of FIG. 7. Further, it is supposed that the extents 1, 2, 3, 4 correspond to areas d1, d2, d3, d4 in the data area of the recording medium. In this case, it is assumed that an area d6 (extent A) between the areas d3 and d4 is a to-be-deleted object and is actually deleted. After this, if the optimization process is performed, the areas d3, d4, d5 are combined to form the area d6 which is managed by a recording extent 3' as shown in the lower stage of FIG. 7.

A to-be-deleted area is formed by the editing process or the like. For example, there occurs a case wherein the user deletes part of the contents, he cuts a specified scene (for example, a commercial portion), or he moves the contents of small capacity or copies the same on another medium and the contents of the information-moved portion or information-copied portion becomes unnecessary.

Figure 8A:
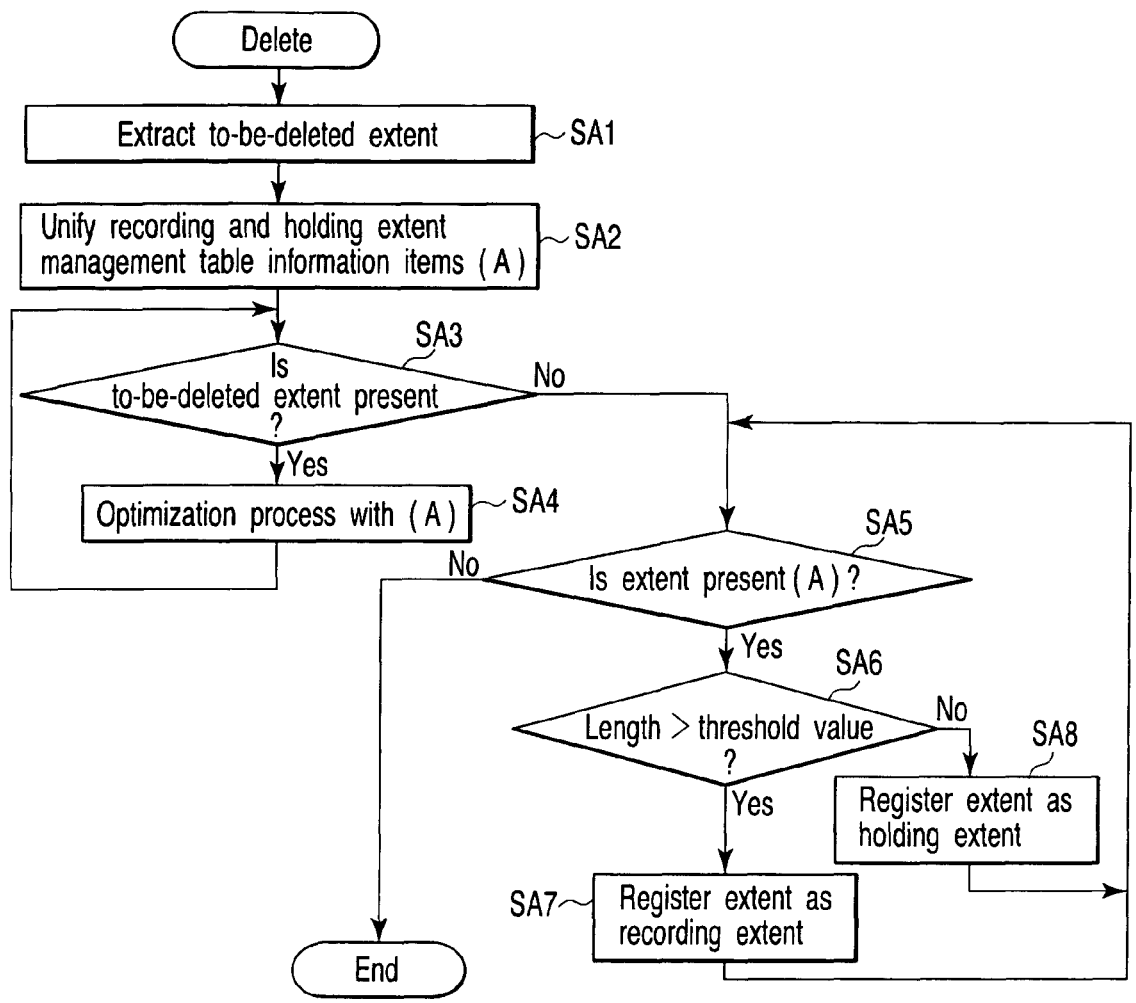
FIGS. 8A and 8B are flowcharts for illustrating one operation example when the apparatus of this invention processes the extent and one operation example when the apparatus performs the recording process for the extent.

Next, the operation of the apparatus of this invention is separately explained by use of different types of embodiments. In FIG. 8A, a first operation example is shown. First, extents which are to-be-deleted objects are extracted from the information recording medium (step SA1). Then, a table created by merging management information items of a recording extent management section 312a and holding extent management section 312b is formed (step SA2). Next, the table and information of all of extents to be deleted are referred to and an optimization process is performed by the optimization processing section 314 (steps SA3, SA4). That is, a coupled extent obtained by coupling one holding extent and another holding (or to-be-deleted or moved) extent lying adjacent thereto is formed.

In the above process, if the deleted extent is no more provided, whether or not a non-registered extent is present is determined (step SA5). If a non-registered extent is present, the process is terminated. However, if the non-registered extent is present, the determining process which determines whether the size of the extent is larger than a threshold value or not is performed (step SA6).

When the size of the non-registered extent is equal to or larger than the preset threshold value, the non-registered extent is set as a new recording extent (step SA7). When the size of the non-registered extent is smaller than the preset threshold value, the non-registered extent is set as a holding extent (step SA8).

Figure 8B:
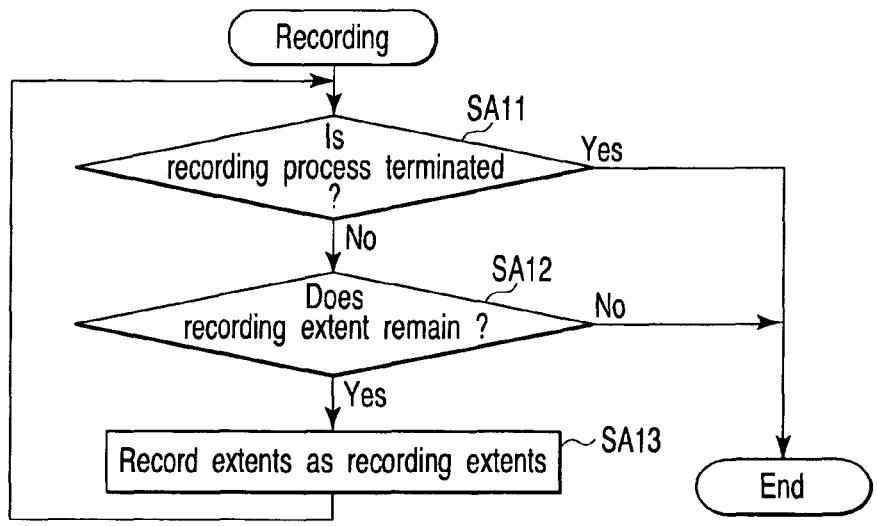

In FIG. 8B, the state in which the recording extent managed by the recording extent management section 312a is used is shown. Whether the recording extent remains or not is determined (steps SA11, SA12), and if the recording extent remains, the process of sequentially recording the extents as recording extents is performed (step SA13).

FIG. 9 shows the above operation together with the management state of the respective management sections. In this case, it is assumed that a to-be-deleted extent (A) occurs in part of the recorded extent managed by the recorded extent management section 311 as shown on the left side of FIG. 9. Further, it is assumed that a space extent (B) adjacent to the to-be-deleted extent (A) is managed by the holding extent management section 312b. In this state, if the optimization process is performed by the optimization processing section 314, a new coupled extent obtained by coupling the to-be-deleted extent (A) and space extent (B) is formed as shown on the right side of FIG. 9. If the size of the coupled extent is equal to or larger than the preset threshold size, the coupled extent is registered in and managed by the recording extent management section 312a as a recording extent.

Figure 10:
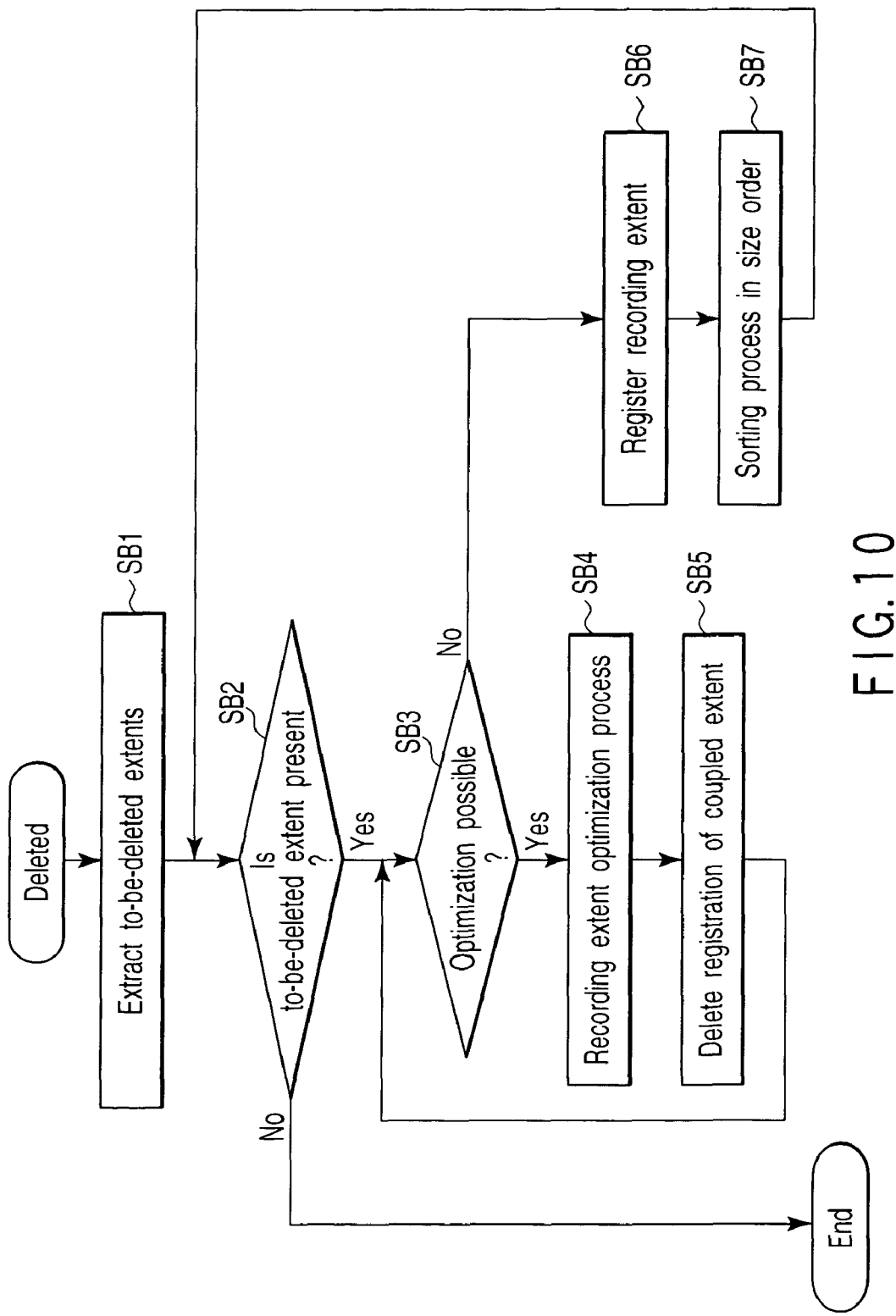
FIG. 10 is a flowchart for illustrating one operation example when the apparatus of this invention performs the optimization process and various registering processes of the extent.
Figure 11:
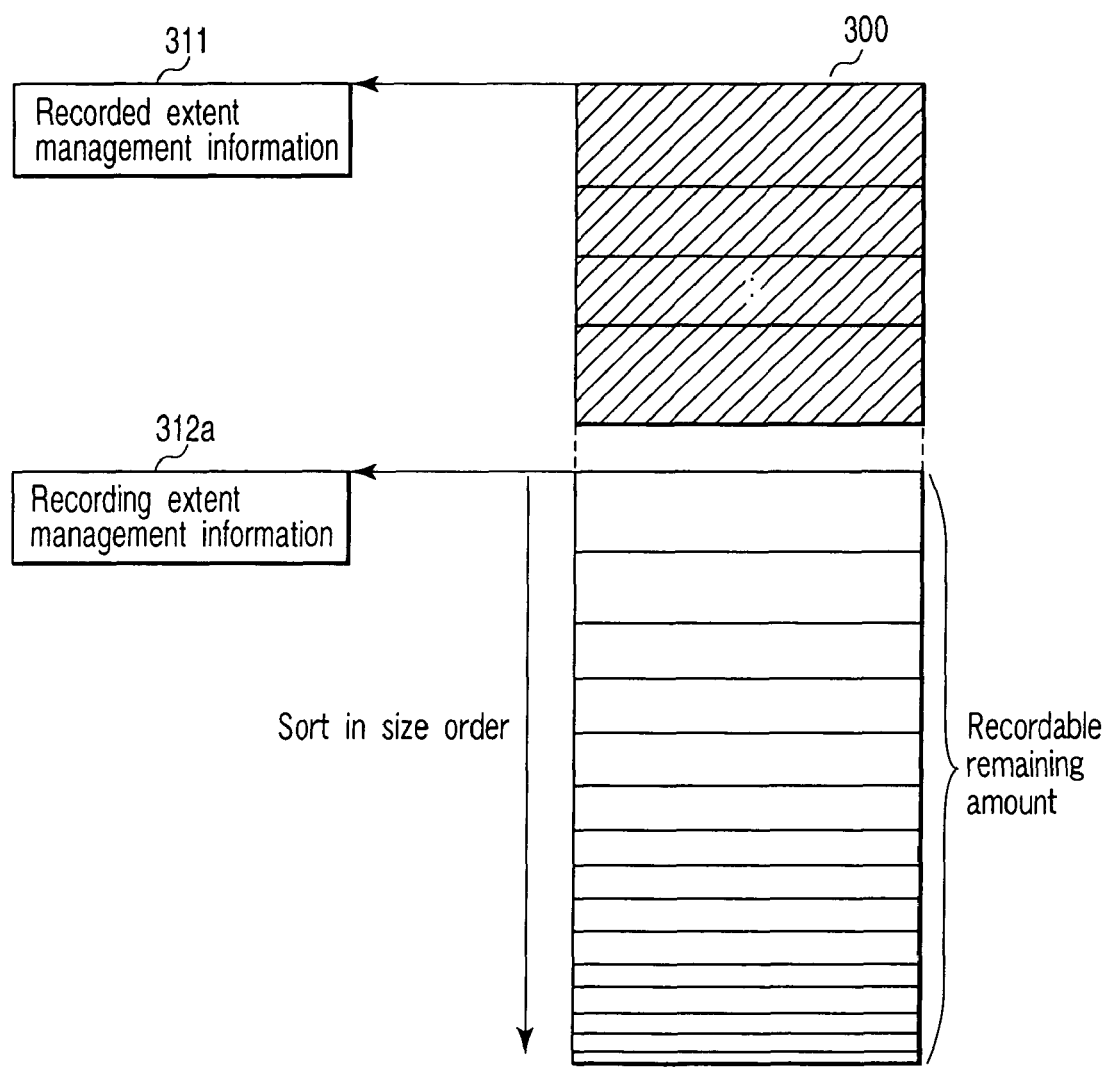
FIG. 11 is an explanatory diagram for illustrating another operation example when the apparatus of this invention manages the extent.

FIGS. 10 and 11 illustrate another embodiment of this invention. The present embodiment indicates the special technique used when the recording extent is managed.

It is considered that he number of holding extents becomes large depending on the threshold value used to determine a holding extent and this gives an influence on the whole recording capacity of the information recording medium. In the present embodiment, a so-called optimization process for forming a coupled extent when a space extent (recording extent) lies adjacent to a to-be-deleted extent is performed. Then, the recording extents are sorted and managed in a size order. That is, to-be-deleted extents are retrieved and extracted (step SB1). When a to-be-deleted extent is present (step SB2), whether or not the to-be-deleted extent can be coupled with a recording extent which is already registered, that is, whether it can be optimized or not is checked (step SB3). If the extent can be optimized, the process for coupling the to-be-deleted extent and recording extent is performed (step SB4). Then, a coupled extent is formed and the registered state of a recording extent contained in the coupled extent is temporarily deleted from the recording extent management section 312a (step SB5). The process of steps SB3 to SB5 is repeatedly performed.

When a to-be-deleted extent which should be optimized is no more present, the former coupled extent is registered as a recording extent (step SB6). Then, the recording extents are subjected to the sorting process in a size order and managed in an order of magnitude (step SB7).

Thus, when data is recorded, the recording extents are used in a size order. According to this method, the whole recording time is prevented from being reduced while occurrence of fragments is suppressed. Further, according to this method, it is not specially required to manage the holding extents as in the former embodiment, but in practice, since the recording extents are subjected to the sorting process, the probability that the extents of small size are used is low and the method becomes substantially equivalent to the embodiment in which the holding extents are managed.

Further, when it is required to suppress the recording extents of small size from being used in realizing the recording and playback processes on the real-time basis, the following method may be additionally provided. That is, it is possible to monitor the sizes of the recording extents sequentially used and terminate the recording process or issue an alarm if the size has reached a predetermined small size. The recordable time can be previously calculated by use of the sizes of the recording extents. That is, a data amount can be acquired by multiplying the data transfer rate bps by the size and the recording time can be estimated based on the data amount.

Figure 12:
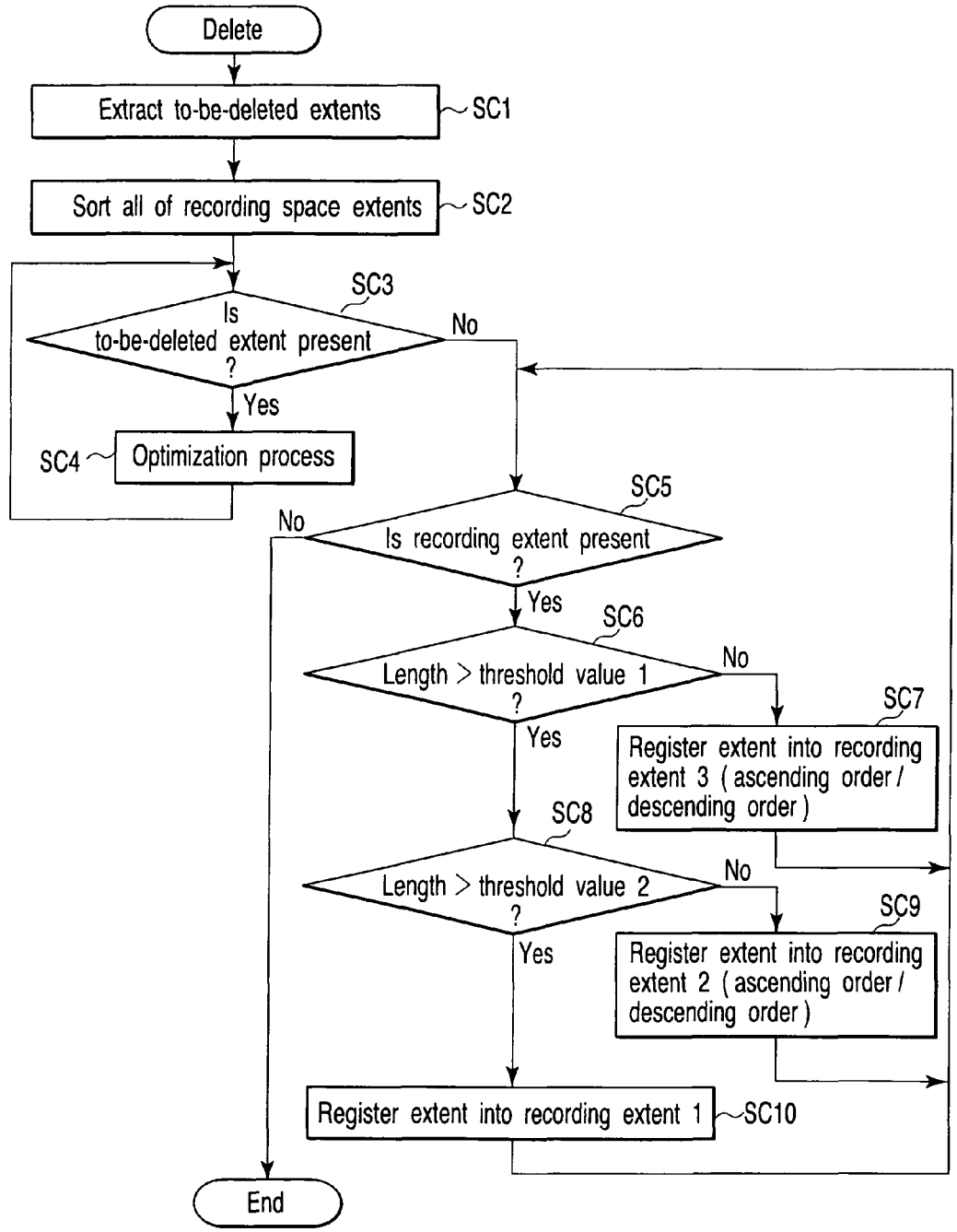
FIG. 12 is a flowchart for illustrating another operation example when the apparatus of this invention performs the optimization process and various registering processes of the extent.
Figure 13:
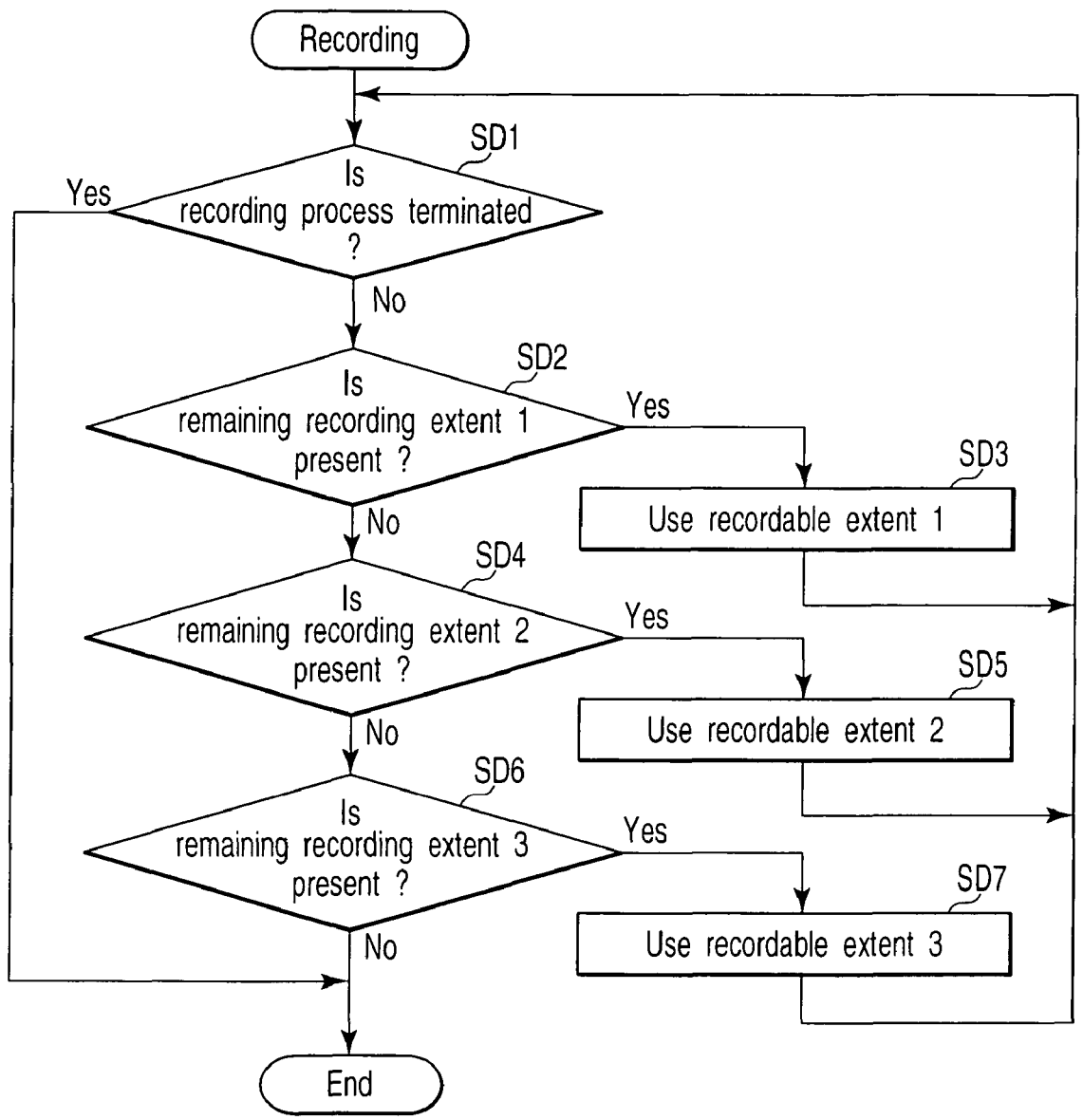
FIG. 13 is a flowchart for illustrating another operation example when the apparatus of this invention performs the recording process for the extent.
Figure 14:
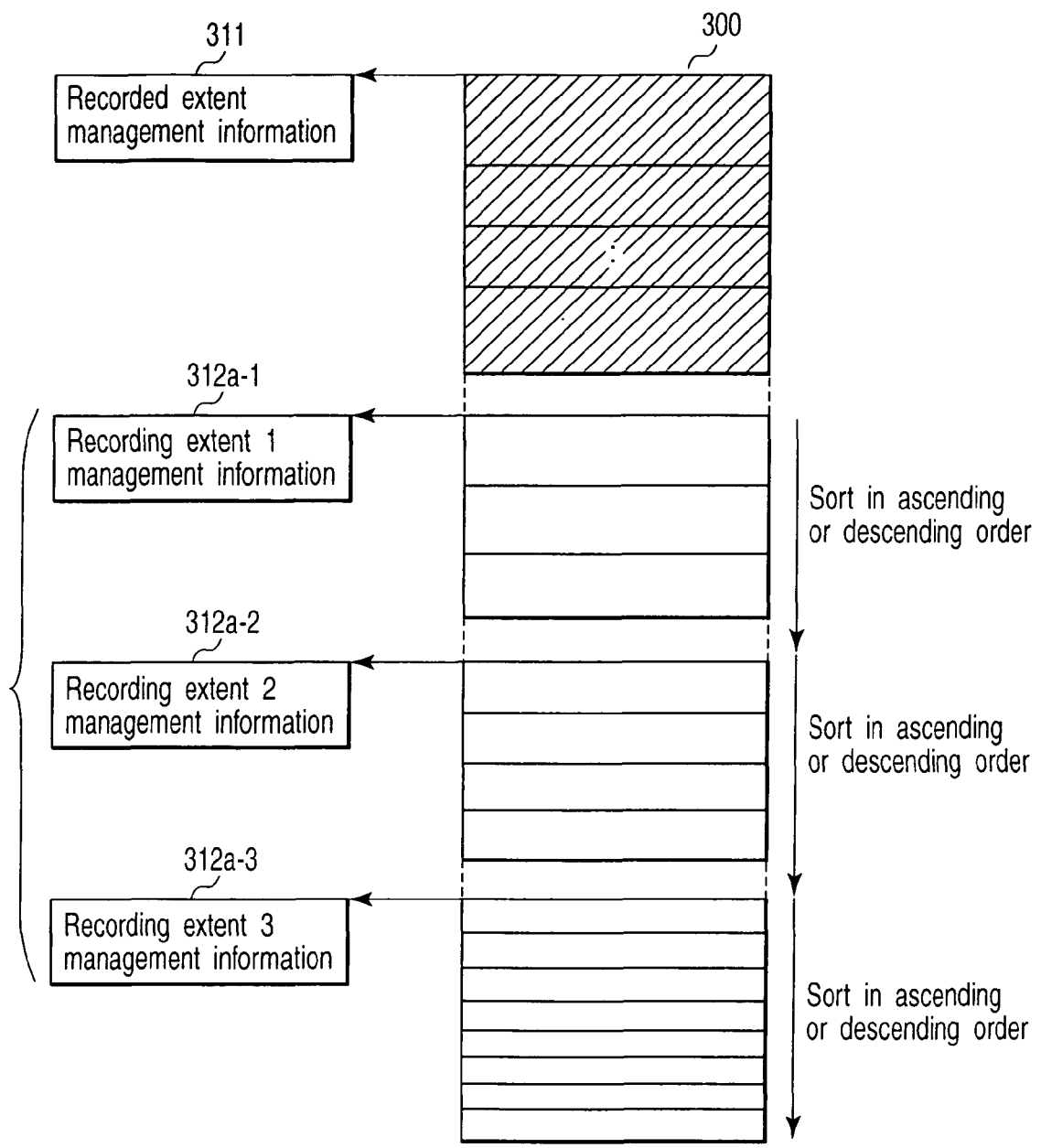
FIG. 14 is an explanatory diagram for illustrating still another operation example when the apparatus of this invention manages the extent.

FIGS. 12, 13 and 14 are flowcharts for illustrating another embodiment of this invention. The present embodiment is to separate the recording extents into some large blocks, sort the extents of the respective blocks according to addresses in an ascending or descending order and use the extents. In the present embodiment, plural stages of extent management blocks are used.

First, to-be-deleted extents are extracted (step SC1). Then, all of the space extents are sorted according to addresses in an ascending or descending order (step SC2). Next, the optimization process is performed in steps SC3, SC4. When the optimization process is terminated, the space extents (recording extents) are classified. That is, the sizes of the extents are checked and the process of classifying the extents into the ranges of size<threshold value 1, threshold value 1<size<threshold value 2 and threshold value 2<size is performed (steps SC6, SC8, SC10). The extent in the range of size<threshold value 1 is registered in the management section 312a as recording extent group 3 (step SC7), the extent in the range of threshold value 1<size<threshold value 2 is registered in the management section 312a as recording extent group 2 (step SC9), and the extent in the range of threshold value 2<size is registered in the management section 312a as recording extent group 1 (step SC10).

FIG. 13 is a flowchart for illustrating a process performed when the extents classified as described above are used for recording. In recording extent group 1, if the recordable extent is present, the extent in group 1 is used (steps SD1, SD2, SD3). If a usable extent is not present in group 1, whether or not a recordable extent is present in recording extent group 2 is checked. If a recordable extent is present in recording extent group 2, the extent in group 2 is used (steps SD4, SD5).

If a usable extent is not present in group 2, whether or not a recordable extent is present in recording extent group 3 is checked. If a recordable extent is present in recording extent group 3, the extent in group 3 is used (steps SD6, SD7).

FIG. 14 shows the state in which the extents are managed by the recorded extent management section 311 and recording extent management section 312*a*. In the present embodiment, since the extents are classified into the three groups, management sections 312*a*-1, 312*a*-2, 312*a*-3 are used.

Figure 15:
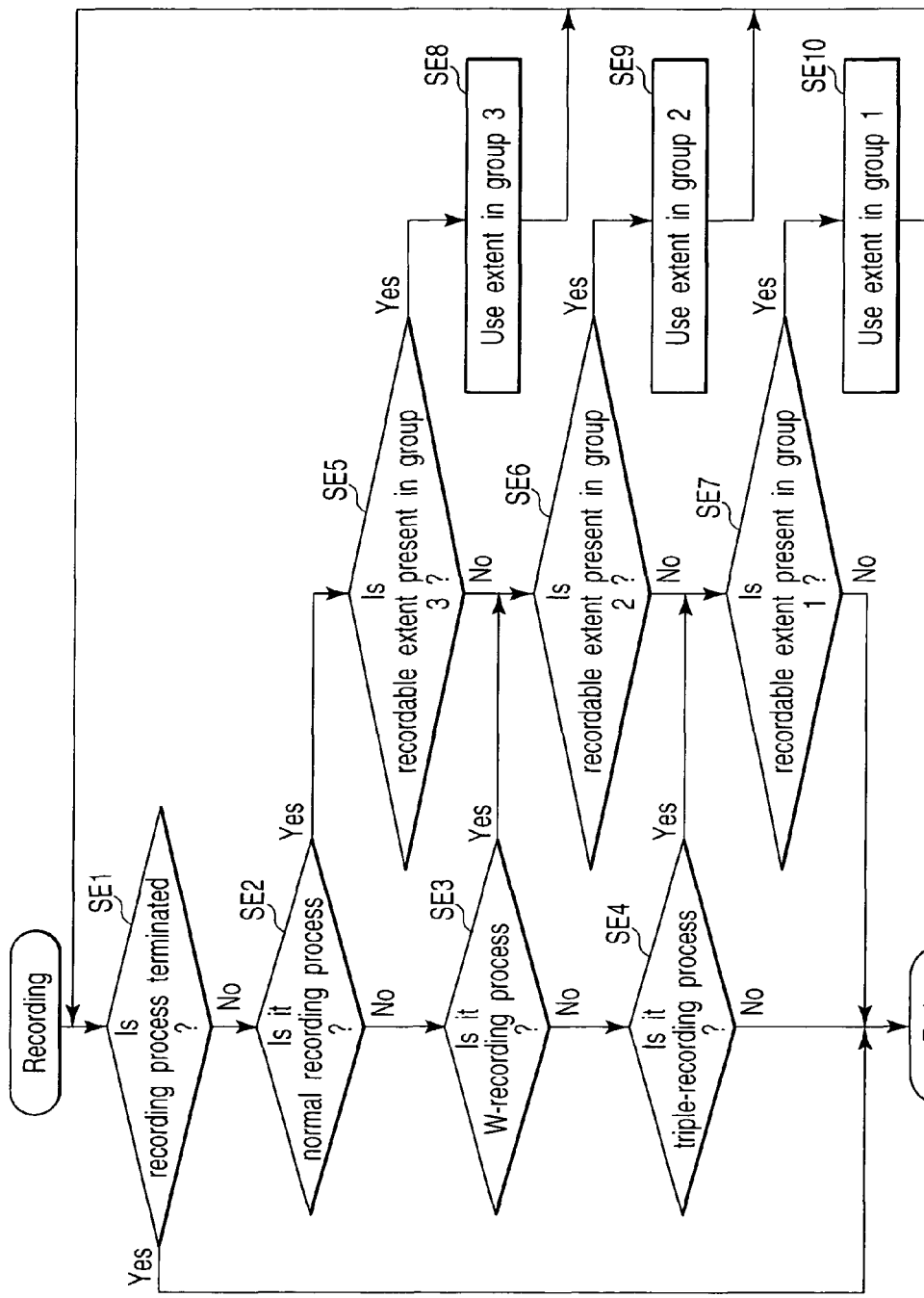
FIG. 15 is a flowchart for illustrating still another operation example when the apparatus of this invention performs the optimization process and various registering processes of the extent.
Figure 16:
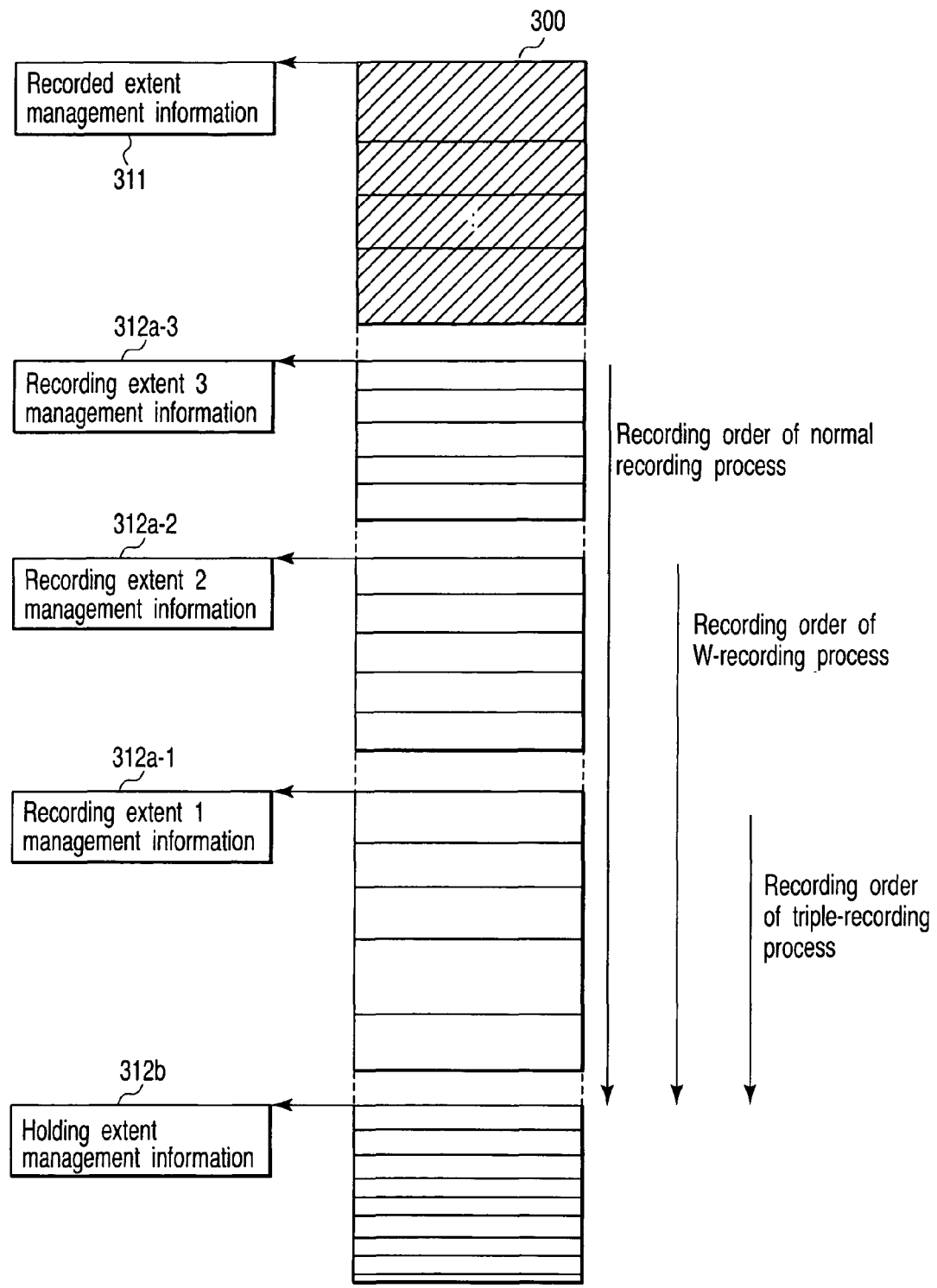
FIG. 16 is an explanatory diagram for illustrating another operation example when the apparatus of this invention manages and uses the extent.

FIGS. 15 and 16 show still another embodiment of this invention. In the present embodiment, the process of managing the holding extents described before is introduced in the embodiment shown in FIGS. 12 to 14 and the utilization method of the recording extents is adequately devised. That is, the recording extent groups used are selectively utilized according to a difference in the recording load. First, as shown in FIG. 16, the holding extent is managed by the management section 312*b*. The other management state is the same as that of FIG. 14.

The size of the holding extent is smaller than the threshold value 1 and smaller than the threshold value 0. Therefore, the holding extent is selected in the process between the steps SC5 and SC6 in the processing flow of FIG. 12.

An operation example in which the space extent managed as described above is used at the recording time is shown in FIG. 15. When the recording process is started, whether the recording process is a normal recording process or not is determined (steps SE1, SE2). If it is the normal recording process, whether or not a recordable extent is present in group 3 is determined (step SE5). Then, if the recordable extent is present, the extent in group 3 is used (step SE8). If the recordable extent is not present in group 3, whether or not a recordable extent is present in group 2 is determined (step SE6). If the recordable extent is present, the extent in group 2 is used (step SE9). If the recordable extent is not present in group 2, whether or not a recordable extent is present in group 1 is determined (step SE7), and if the recordable extent is present, the extent in group 1 is used (step SE10).

If it is determined in the step SE2 that the recording process is not the normal recording process, whether or not the recording process is set in a two-program simultaneous recording mode (so-called W-recording mode) is determined. In the case of the two-program simultaneous recording mode, whether or not a recordable extent is present in group 2 is determined (step SE6). If the recordable extent is present, the extent in group 2 is used (step SE9). If the recordable extent is not present in group 2, whether or not a recordable extent is present in group 1 is determined (step SE7), and if the recordable extent is present, the extent in group 1 is used (step SE10).

When it is determined in step SE3 that the recording process is not set in the W-recording mode, whether or not the recording process is set in a three-program simultaneous recording mode (so-called triple-recording mode) is determined. In the case of the triple-recording mode, whether or not a recordable extent is present in group 1 is determined (step SE7), and if the recordable extent is present, the extent in group 1 is used (step SE10). In the other cases, the present state is displayed and the process is terminated.

At the above recording time, the usable extent determining section 316 shown in FIG. 1 is used to determine the order and group of the extents to be used.

In the above example, the extents in each group may be used in a sequential order or in an order of extents with closer addresses. When the extents are used in an order of extents with closer addresses, a method for previously sorting and arranging recordable extents in an order of extents with closer addresses by use of the extent arrangement processing section 315 is provided. Alternatively, a method for sorting addresses in each group when the extents are used and using the extents in an order of extents with closer addresses can be used. Thus, an increase in the pickup moving distance at the time of the seek operation can be suppressed and the operation load on the apparatus can be alleviated.

This invention is not limited to the above embodiments. A method for managing video data is roughly divided into two methods. The first method is a method (A) for managing video data as one file irrespective of the number of titles recorded and attained by use of VR of DVD. The second method is a method (B) for managing video data of two programs as different files when they are simultaneously recorded as is used for W-recording or the like.

In the method A, a recording extent is used for one file. In the method B, different recording extents are allocated to different files.

For example, in an example shown in FIG. 16, in the case of normal recording, the extent of recording extent group 3 is first utilized and used as an additional-use extent for the normal recording file. If the process is changed into the W-recording mode on the way, the extents of recording extent group 2 are utilized for both of the normal recording file and W-recording file.

Immediately after the changeover of the modes, the extent of recording extent group 3 is used in the normal recording file. However, in this case, since access to the W-recording file is additionally made, the access time becomes longer in comparison with that of the normal recording mode. The possibility that recording data which cannot be output to the recording medium remains in the cache buffer when a next extent is supplied from recording extent group 2 becomes stronger. If an excessive amount of data is stored in the cache buffer, there occurs a possibility that the recording process cannot be performed due to overflow. Therefore, in order to solve the above problem, the operation of speeding up the process for outputting data of the cache buffer to the recording medium is performed immediately after the mode switching operation. To serve the above purpose, extents may be supplied from recording extent group 1 with larger size instead of recording extent group 2 as recording extents supplied for the normal recording file immediately after the mode switching operation. In this case, since there occurs a possibility that a problem occurs at the time of the mode switching operation like the above case when the process is changed into the triple-recording mode, an extent group of still larger size may be prepared.

As described above, the apparatus of this invention basically includes the data processing section 1003 which records data on the information recording medium and reads out data recorded on the information recording medium, the encoder section 50 which converts input-data into recording data and supplies the thus converted data to the data processing section, the decoder section 60 which decodes data output from the data processing section, and the system control section 30 which generally controls the data processing section, encoder section and decoder section. It further includes the to-be-deleted extent processing section 310 which reads out management information of the information recording medium and recognizes the to-be-deleted extent based on the operation of the system control section 30, the space extent management section 312 which recognizes and manages space extents, the optimization processing section 314 which forms a coupled extent by coupling a to-be-deleted extent and space extent in a condition that the extents are adjacent to each other and optimizes the coupled extent as one space extent so as to be used for recording, and the extent arrangement processing section 315 which arranges and manages the space extents in a preset rule.

The space extent management section 312 includes the holding extent management section 312b which manages those of the space extents which have a size smaller than the preset size the holding extents and the recording extent management section 312a which manages those of the optimized extents which have a size equal to or larger than the preset size as recording extents.

Further, the space extent management section 312 and extent arrangement processing section 315 can classify the space extents according to the sizes thereof depending on a plurality of threshold values and manage the extents classified into a plurality of groups. In this case, the usable extent determining section 316 is provided which sequentially uses the extents selected from the groups of extents in an order of the groups of extents of larger size when the space extents are used as the recording extents.

Further, the usable extent determining section 316 can use extents in an order of extents with closer addresses when the space extents are used as the recording extents.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording/playback method for an information recording/playback apparatus including a data processing section which records data on an information recording medium and reads out data recorded on the information recording medium, an encoder section which converts input data into recording data and supplies the thus converted data to the data processing section, a decoder section which decodes data output from the data processing section, and a system control section which generally controls the data processing section, encoder section and decoder section, comprising:

causing the system control section to read out management information of the information recording medium,
    causing the system control section to recognize a to-be-deleted extent,
    causing the system control section to recognize space extents,
    forming a coupled extent by coupling a to-be-deleted extent and space extent in a condition that the extents are adjacent to each other and optimizing the coupled extent as one space extent to be used for recording, and
    arranging and managing the space extents in a preset rule.

2. The information recording/playback method according to claim 1, further comprising:

managing those of the space extents which have a size smaller than a preset threshold value as holding extents,
    optimizing those of the holding extents and space extents which satisfy the above condition, and
    managing those of the space extents which have a size not smaller than the preset threshold value as recording extents.

3. The information recording/playback method according to claim 1, further comprising:

classifying the space extents according to the size thereof depending on a plurality of threshold values and separately managing the space extents for a plurality of groups, and
    sequentially using the extents selected from the groups of extents in an order of the groups of the extents of larger size when the space extents are used as the recording extents.

4. The information recording/playback method according to claim 1, further comprising:

classifying the space extents according to the size thereof depending on a plurality of threshold values and separately managing the space extents for a plurality of groups, and
    sequentially using the extents in an order of extents with closer addresses when the space extents of each group are used as the recording extents.

5. The information recording/playback method according to claim 1, further comprising:

classifying the space extents according to the size thereof depending on a plurality of threshold values and separately managing the space extents for a plurality of groups, and
    changing the order of the groups used according to one of a single program recording state and plural program recording state which is set when the space extents of each group are used as the recording extents.

6. The information recording/playback method according to claim 1, further comprising:

classifying the space extents according to the size thereof depending on a plurality of threshold values, sequentially dividing the extents into a plurality of groups by setting a group of extents of a size in a first range to a first group and setting a group of extents of a size smaller than the size in the first range to a second group, and separately managing the extents for the plurality of groups, and
    preferentially using the extents of the first group when a state in which plural programs are simultaneously recorded is set in a case where the space extents of each group are used as the recording extents and preferentially using the extents of the second group when a state in which a single program is recorded is set.

7. An information recording/playback method for an information recording/playback apparatus including a data processing section which records data on an information recording medium and reads out data recorded on the information recording medium, an encoder section which converts input data into recording data and supplies the thus converted data to the data processing section, a decoder section which decodes data output from the data processing section, and a system control section which generally controls the data processing section, encoder section and decoder section, comprising:

causing the system control section to recognize a to-be-deleted extent,
    causing the system control section to classify space extents according to size thereof and manage those of the space extents which have a size not smaller than a preset threshold value as recording extents, causing the system control section to manage those of the space extents which have a size smaller than the preset threshold value as holding extents, and causing the system control section to optimize a coupled extent to be used as a recording extent in a condition that the size of the coupled extent obtained by coupling a to-be-deleted extent and space extent which are adjacent to each other is not smaller than the preset threshold value.

8. An information recording/playback apparatus comprising:

a data processing section which records data on an information recording medium and reads out data recorded on the information recording medium, an encoder section which converts input data into recording data and supplies the thus converted data to the data processing section, a decoder section which decodes data output from the data processing section, a system control section which generally controls the data processing section, encoder section and decoder section, a to-be-deleted extent processing section which reads out management information of the information recording medium and recognizes a to-be-deleted extent based on the operation of the system control section, a space extent management section which recognizes and manages space extents, an optimization processing section which forms a coupled extent by coupling a to-be-deleted extent and space extent in a condition that the extents are adjacent to each other and optimizes the coupled extent as one space extent to be used for recording, and an extent arrangement processing section which arranges and manages the space extents in a preset rule.

9. The information recording/playback apparatus according to claim 8, wherein the space extent management section includes a holding extent management section which manages those of the space extents whose size is smaller than a preset threshold value as holding extents and a recording extent management section which manages those of the optimized extents whose size is not smaller than the preset threshold value as recording extents, and the optimization processing section optimizes those of the holding extents and space extents which satisfy the above condition.

10. The information recording/playback apparatus according to claim 8, in which the space extent management section and extent arrangement processing section classify the space extents according to sizes thereof depending on a plurality of threshold values and divide the space extents into a plurality of groups and manage the same, and which further comprises a usable extent determining section which sequentially uses extents selected from the groups of extents in an order of the groups of extents of larger sizes when the space extents are used as recording extents.

* * * * *